(No Model.) 3 Sheets—Sheet 1.
W. & J. REUTHER.
POTATO DIGGER.
No. 572,567. Patented Dec. 8, 1896.
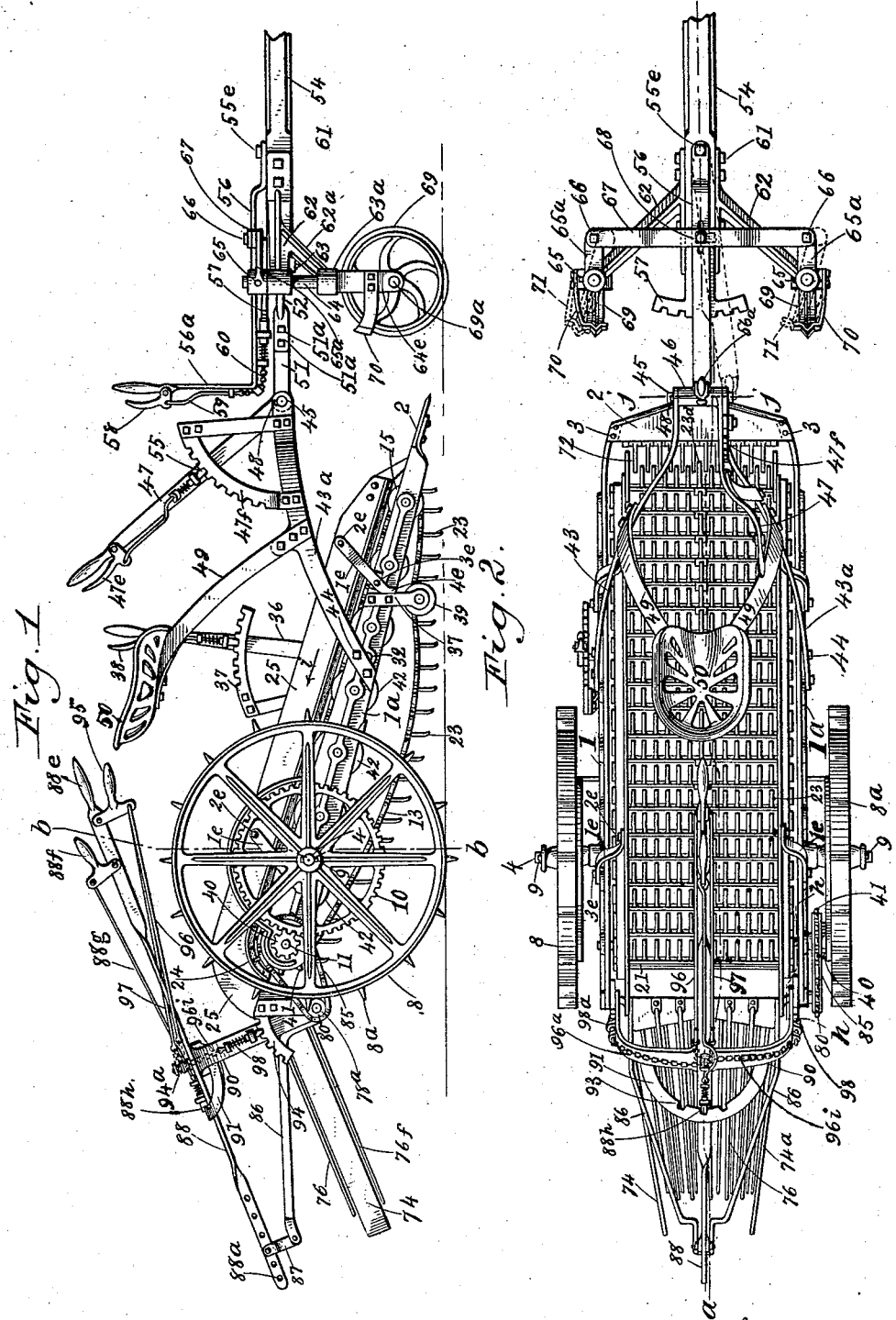
Witnesses,
Emil Neuhart
L. M. Spong
Inventors:
William Reuther
John Reuther
By James Sangster, Attorney.

(No Model.) 3 Sheets—Sheet 2.
W. & J. REUTHER.
POTATO DIGGER.
No. 572,567. Patented Dec. 8, 1896.
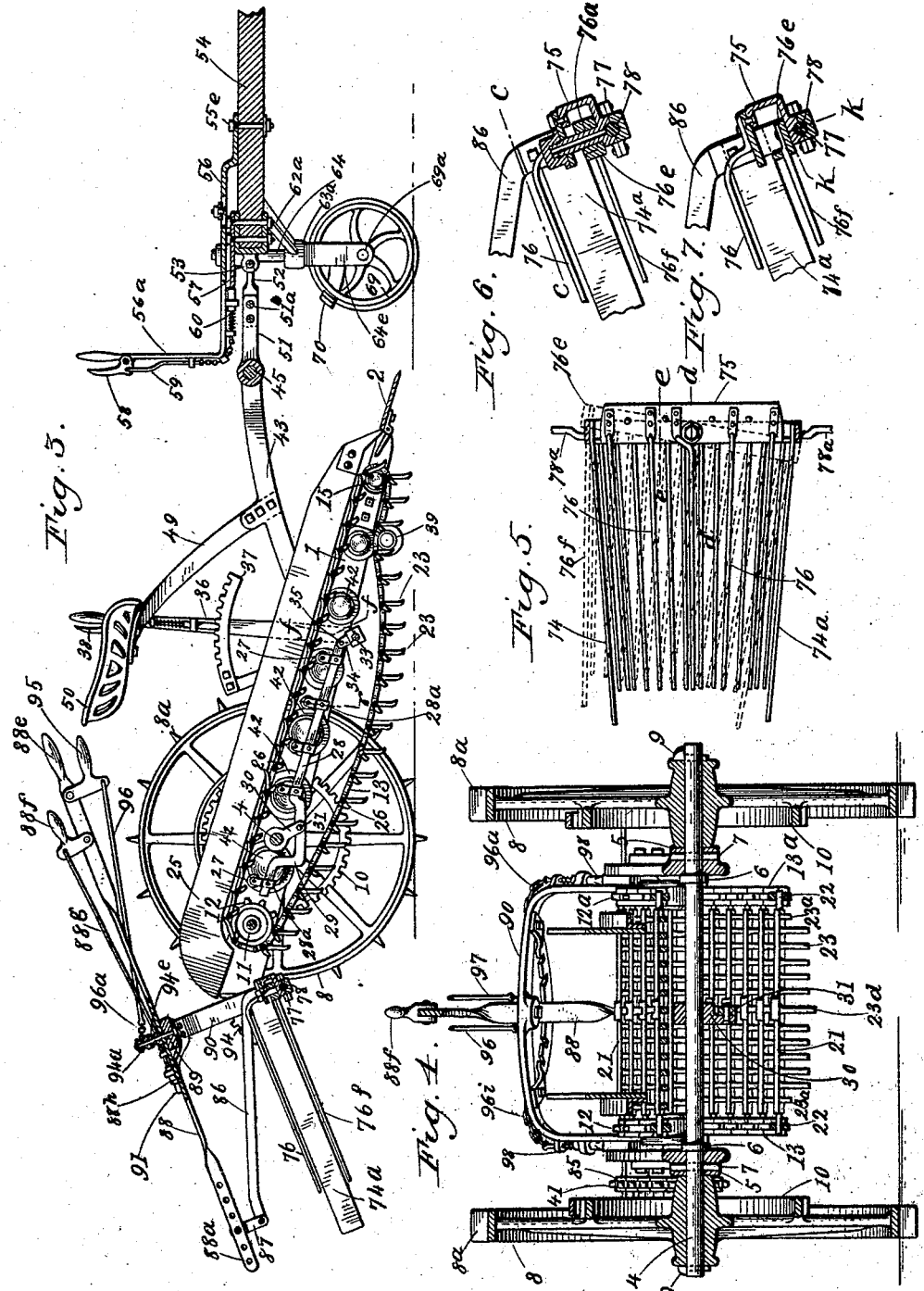
Witnesses,
Emil Neukart
L. M. Spong
Inventors,
William Reuther
John Reuther
By James Sangster, Attorney.

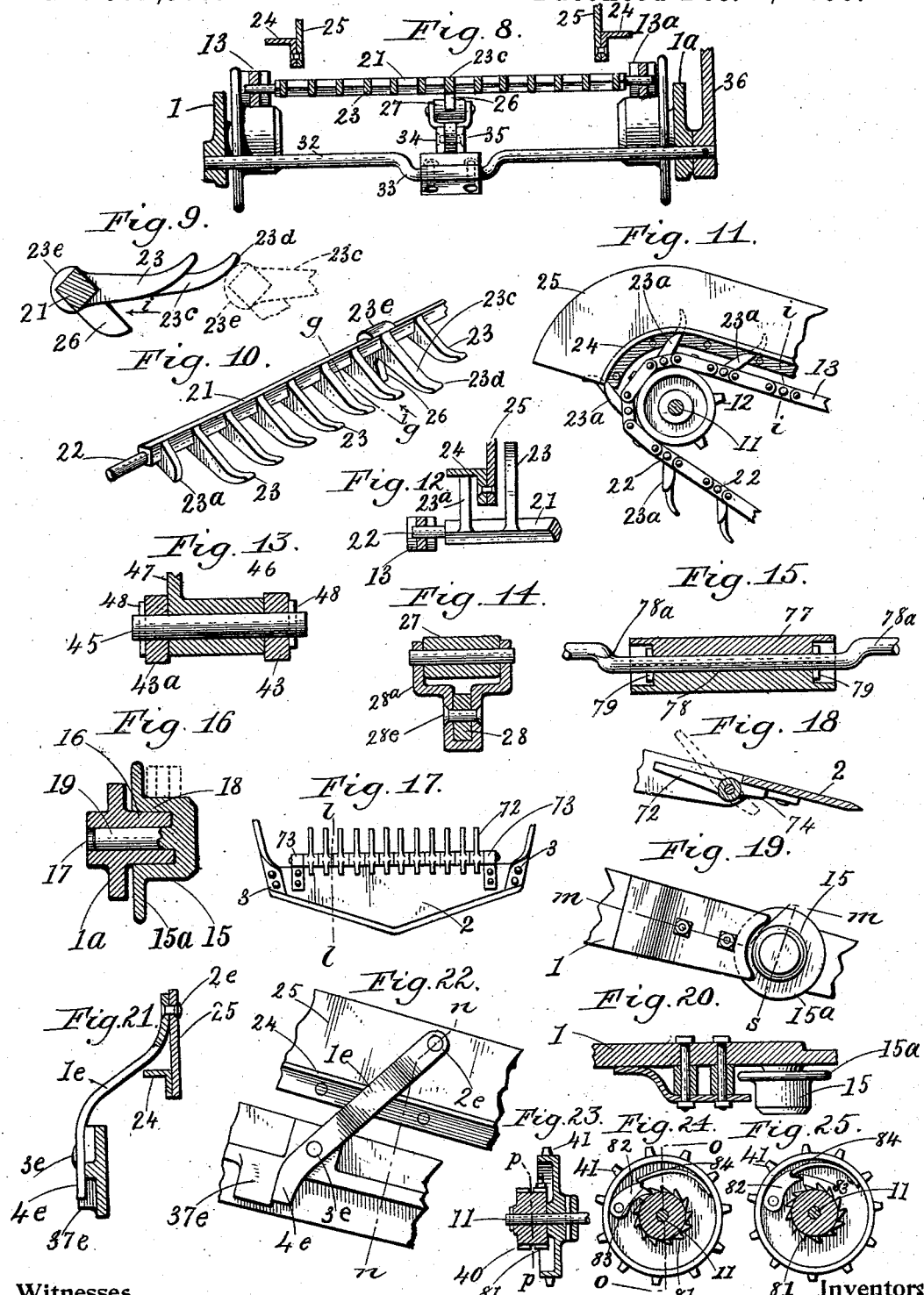

UNITED STATES PATENT OFFICE.

WILLIAM REUTHER AND JOHN REUTHER, OF ELMA, NEW YORK.

POTATO-DIGGER.

SPECIFICATION forming part of Letters Patent No. 572,567, dated December 8, 1896.

Application filed April 9, 1896. Serial No. 586,832. (No model.)

*To all whom it may concern:*

Be it known that we, WILLIAM REUTHER and JOHN REUTHER, citizens of the United States, residing at Elma, in the county of Erie and State of New York, have invented certain new and useful Improvements in Potato-Diggers, of which the following is a specification.

Our invention relates to certain details of construction and to improvements whereby the machine is rendered more efficient and complete in its operation, all of which will be fully and clearly hereinafter described and claimed, reference being had to the accompanying drawings, in which—

Figure 1 represents a side elevation of the machine. Fig. 2 represents a top plan view of the same. Fig. 3 is a vertical central section on or about line $a\ a$, Fig. 2. Fig. 4 represents an enlarged transverse section on or about line $b\ b$, Fig. 1. Fig. 5 is a section on or about line $c\ c$, Fig. 6, showing a detached top view of the shaker. Fig. 6 is a cross-section through the shaker-bar on or about line $d\ d$, Fig. 5. Fig. 7 represents a cross-section through the shaker-bar on or about line $e\ e$, Fig. 5. Fig. 8 is a transverse section cutting through the machine on or about line $f\ f$, Fig. 3. Fig. 9 represents a cross-section through one of the elevator-bars on or about line $g\ g$, Fig. 10. Fig. 10 is a perspective view of a portion of one of the pivoted transverse elevator-shaking bars. Fig. 11 is a section on or about line $h\ h$, Fig. 2, showing an enlarged side elevation of a portion of the elevator, sprocket-chain, and shield. Fig. 12 represents a transverse vertical section on or about line $i\ i$, Fig. 11. Fig. 13 is a transverse vertical section on or about line $j\ j$, Fig. 2, all parts beyond the section being omitted. Fig. 14 represents a section on or about line $r$, Fig. 3, cutting through one of the stationary agitating-rollers and its forked supporting portion. Fig. 15 represents a section on or about line $k\ k$, Fig. 7. Fig. 16 is a vertical central cross-section of one of the chain-supporting rollers and its bearing on or about line S, Fig. 19. Fig. 17 is an inverted plan view of the shovel. Fig. 18 is a section on or about line $l\ l$, Fig. 17. Fig. 19 is an inside side elevation of the front portion of the frame. Fig. 20 represents a horizontal section on or about line $m\ m$, Fig. 19. Fig. 21 is a section on or about line $n\ n$, Fig. 22. Fig. 22 is a side elevation of the device for supporting the shield. Fig. 23 represents a vertical central section on line $o\ o$, Fig. 24, through the sprocket-wheel and clutch at the head of the elevator. Fig. 24 is a section on or about line $p\ p$, Fig. 23, showing the pawl in position to engage with the ratchet and drive the elevator. Fig. 25 is a similar section showing the pawl out of engagement with the ratchet.

Referring to the details of the machine as shown in said drawings, 1 and $1^a$ represent the side frame-pieces of the machine. They are preferably made of cast iron or steel or other suitable material. At the front they are rigidly connected to the shovel-plow 2 by rivets or bolts 3. (See Figs. 2 and 17.) At the opposite ends the side frame-pieces are supported by the axle 4. On the outer side of each side frame 1 and $1^a$ is a boss or enlargement 5, (see Fig. 4,) through which the axle 4 passes until stopped by the shoulders 6. They are then rigidly secured in place by a pin 7 or other well-known means.

On the shaft 4 are mounted the driving and supporting wheels 8, having the usual spurs $8^a$. These wheels are secured to the axle by means of a pin or key 9, so as to turn easily thereon, (see Figs. 1, 2, and 4,) and each is provided with a spur gear-wheel 10, rigidly secured to it or preferably formed in one integral piece with it in the usual way.

At the head of the side frame-pieces 1 and $1^a$ is mounted in suitable bearings a transverse shaft 11, on which two sprocket-wheels 12 and $12^a$ are mounted and rigidly secured by a key or other well-known means. (See Figs. 3 and 4.) These sprocket-wheels are located at or near each opposite inner side of the side frame-pieces 1 and $1^a$, and carry the elevator endless sprocket-chains 13 and $13^a$. The lower portion of each sprocket-chain passes around a roller 15. (See Figs. 1 and 3.)

The construction of the rollers 15 will be better understood by reference to Fig. 16, which is a transverse section through a portion of one of the side frames, the side frame $1^a$, for instance, cutting also through one of the rollers 15 and its bearings.

On the inner side at the foot of each side frame-piece is an extending hub 16, having a central hole 17 bored through it. The roller 15 is provided with a circular depression 18, adapted to fit and turn easily on the hub 16. It is also provided with an outward-extending pin 19, adapted to fit nicely in the hole 17 and turn freely therein. The roller 15 is therefore provided with two wearing-surfaces and will consequently last longer. It is also provided with a flange 15ª on that side next to its supporting side frame-piece.

Mounted on and between the two sprocket-chains 13 and 13ª is a series of transverse bars 21, having their pivotal bearings 22 in the chain. (See Figs. 1, 3, 4, 11, and 12.) These bars are located at substantially equal distances apart and are provided with a series of teeth 23, extending forward from one side. Near each end of the bar is a shorter tooth 23ª, the object of which is to prevent the teeth 23 from being thrown up and back by striking against the rib 24, which extends out from the elevator and sprocket-chain shield 25 as they pass along under said shield. (See Fig. 11.)

To keep the teeth 23 substantially in a longitudinal line with the top side of the endless sprocket-chain, so as to lie flat at the top side of the elevator, we use a long tooth 23ᶜ at or near the center of each bar 21. The point 23ᵈ of each tooth extends forward far enough to lie or rest on one of the enlargements 23ᵉ at the back of each tooth 23ᶜ, (see Fig. 9, where this is illustrated,) one tooth 23ᶜ being shown and one of the bars in front of it being in dotted lines. These bars 21, with their teeth, are preferably made of cast metal all in one integral piece.

At the lower rear portion of the long tooth 23ᶜ, extending downward and inclining slightly forward, is what may be called an "agitating-tooth" 26. This tooth 26, as the elevator moves in the direction of the arrow *i*, Figs. 1, 8, 9, and 10, is drawn over a series of friction-rollers 27 and is moved quickly up and down every time it passes over one. These rollers are adapted to be adjusted up or down, and their construction, arrangement, and means and manner of operation will be readily understood by reference to Figs. 3 and 14.

28 represents a supporting-bar (see Fig. 3) having a downward-extended portion 29 to escape the axle 4. On the axle 4 is loosely mounted a short crank-arm 30, (see Figs. 3 and 4,) to which the part 29 is pivoted by a pin 31. At or near the lower end of the bar 28 is mounted in the side frame-pieces 1 and 1ª a transverse crank-shaft 32. (See Figs. 1, 3, and 8, where this crank-shaft is shown, the crank portion 33 being shown in Fig. 8.) To the crank portion 33 is secured a short arm 34, having its upper end pivoted to the lower end of the bar 28 by a pin 35. To the outer end of the shaft 32, that end that passes through the frame-bar 1, is mounted and rigidly secured an arm 36. Alongside of the arm 36 is secured to the side of the machine a curved rack-bar 37. On the arm 36 are the usual sliding bolt and spring for keeping it in engagement with the rack-bar, and a handle 38 for disengaging it therefrom. On the bar 28 is rigidly secured by pins 28ᶜ (see Figs. 3 and 14) a series of forked supporting-pieces 28ª, carrying the rollers 27.

From the above description it will be seen that by moving or adjusting the arm 36 to the point desired the rollers 27 may be adjusted up or down, and thereby give a greater or less shaking movement to the elevator-screen, and it will be further seen that as the endless sprocket-chains 12 and 12ª pass down and forward on the under side the transverse bars 21 (see Figs. 1 and 3) will turn in their bearings and the teeth 23, 23ª, and 23ᵈ will turn downward by gravity, as shown in said Figs. 1 and 3, thereby leaving much longer openings at the bottom of the screen than at the top, as will be apparent by reference to Figs. 1 and 2. The object of this construction is to have a sufficiently close screen on top to carry the potatoes, both large and small, up over the elevator, as will more clearly hereinafter appear.

To prevent the lower portion of the elevator-screen from dropping down too low, a substantially vertical supporting-bar 37 is secured by bolts to each side of the machine. On each of these depending bars 37 is mounted a friction-roller 39, upon which the sprocket-chains are supported, substantially as shown in Figs. 1 and 3. The upper sides of the sprocket-chains are supported by a series of rollers 42. (See Figs. 1 and 3.)

Motion is communicated to the elevator by means of a pinion 40, (see Figs. 1 and 2,) rigidly secured to the shaft 11 at that end outside of the side frame-piece 1ª, which pinion 40 gears in with the spur gear-wheel 10. Inside of the pinion 40, also mounted on the shaft 11, is a sprocket-wheel 41, the use of which will appear farther on. It will be noticed that the shields 25 (of which there are two, one at each side of the machine) are supported on pivoted arms 1ᶜ, pivoted at the points 2ᶜ and 3ᶜ. The lower ends 4ᶜ of the arms at the front are stopped from allowing the shield to move too far forward and down by coming in contact with the side of bars 37, while said arms have a free movement the other way. The rear or upper arms are stopped by the portion 37ᶜ. (See Figs. 21 and 22.) The object of this construction is to provide the means for protecting the shield from being broken by an obstruction or stone coming in contact with it. If a stone should come in the way, the shield will move backward and upward and thereby leave room for it to either pass under out of the way or up over the elevator without breaking the machine.

The draft-frame consists of two curved side pieces 43 and 43ª. (See Figs. 1, 2, and 3.) They are secured to the side frame-pieces 1 and 1ª by bolts 44. (See Figs. 1 and 2.) These curved side pieces 43 and 43ª extend forward and curve in toward each other and then extend forward parallel with each other a short distance, (see Fig. 2,) and between their forward ends is pivoted by a pin 45 the hub 46, that extends from one side of the arm 47, (see Figs. 2 and 13,) where the arm 47 and its hub 46 are shown, also the pin 45, that secures it. The pin 45 is kept in place by the pins 48. Two bars 49 (see Figs. 1, 2, and 3) support the driver's seat 50. The handle 47 and the portion 51 are in one integral piece, so that when one part is moved the other moves with it. The handle 47 is provided with a handle 47ᵉ and the usual and well-known means in connection with a toothed rack-bar 47ᶠ, which is rigidly secured to the side draft-bar 43ª (see Figs. 1 and 2) for lifting a bolt 55 (shown in Fig. 1) and thereby adjusting the same to any notch desired, the object of which will appear farther on. The portion 51 passes in between the forked parts of the U-shaped portion 52 and is rigidly secured thereto by bolts 51ª. The forward part of this portion 52 is substantially of a U shape and is passed through an eyepiece 53, forming the rear part of the draft-poles 54, so that these parts are capable of turning in any direction. (See Fig. 3, where a section through this part is shown.) These parts being made of wrought-iron are formed and put together by the blacksmith in the well-known way, but they may be made of malleable cast-iron, if desired.

On the top of the draft-pole 54 is pivoted by a bolt 55ᵉ (see Figs. 1, 2, and 3) an angular adjusting-arm 56. The horizontal portion 56 extends backward to within easy reach of the driver and terminates in an upwardly-extending arm 56ª. Rigidly secured to the top of the draft-pole 54, immediately below the arm 56, is a horizontal curved tooth-bar 57. (See Figs. 1, 2, and 3.) This handle-bar is provided with the usual pivoted handle 58, having a substantially vertical bar 59, connecting by a chain 60 (see Figs. 1 and 3) with the usual spring-bolt that engages with the curved tooth-bar 57 for disengaging or engaging therewith.

Secured to each side of the draft-pole by bolts 61 is a supporting frame-bar 62, both extending outward and backward from each side of the draft-pole. At the outer end of each frame-bar 62 is a vertical bearing 63 and 63ª, the lower one being supported by a brace 62ª, (see Fig. 1,) in each of which is mounted a forked bar 64. At the top of bars 64 is rigidly secured by a pin 65 a short arm 65ª, (see Figs. 1 and 2,) to the outer ends of each of which is pivoted by bolts 66 a transverse connecting-bar 67. This bar 67 is pivoted by a pin 68 at or about the center to the horizontal portion 56 of the pivoted adjusting-arm. In the forked portion 64ᵉ of each bar 64 is mounted a supporting and guiding wheel 69 on a short shaft 69ª, upon which they turn, and rigidly secured to each forked portion is a mud-scraper 70.

From the above description it will be seen that the shovel-plow 2 may be adjusted and secured either up or down at any required point by operating the handle 47 and that the wheels 69 may be turned to any suitable angle and secured at the required point by means of the adjusting-arm 56ª 58 and its several parts, substantially as shown by the dotted lines 71 in Fig. 2, the object being to provide the means to keep the machine from tending to run downward while operating on a sidehill.

The shovel-plow at the rear is provided with a series of loosely-pivoted bars 72. (See Figs. 3, 17, and 18, more particularly Figs. 17 and 18.) They are secured to the plow by the pivoted holding-pieces 73, which are riveted or otherwise fastened to the bottom of the shovel, substantially as shown in Fig. 17, showing an under side view of the shovel. These are pivoted so that each will swing independently on its pivotal support, which is a rod extending from one support 73 to the other, and they are stopped from turning down too far by means of a short piece 74, which strikes against the under side of the shovel, (see Fig. 18,) the construction being such that they can turn upward, as shown by the dotted lines in said Fig. 18. The object of this construction is to provide the means to allow a stone or other obstruction that may come in the way to pass up through and then be carried out of the way up and over the elevator.

At the rear of the machine is the shaking-screen. It consists of the two supporting side frames 74 74ª, rigidly secured to a transverse bar 75. (See Figs. 5, 6, and 7.) On the top of the bar 75 is riveted or otherwise firmly secured a series of upper shaker-bars 76. Their object is to allow potato-vines, weeds, or other similar material that is brought up over the elevator to pass over, the bars 76 being far enough apart to allow the potatoes to drop through to the screen below, as will appear farther on. At the under side of the transverse bar 75 is a box 77, in which is mounted a crank-shaft 78, which is prevented from moving longitudinally in the box by means of pins 79. (Shown in Fig. 15.) The crank ends 78ª of the shaft 78 are mounted in boxes in the side frame-pieces 1 and 1ª, and firmly secured to one end of said shaft is a small sprocket-wheel 80, rigidly fastened to the shaft 11, in a line with the larger sprocket-wheel 41. (See Figs. 1 and 2.)

The sprocket-wheel 41 is provided with a clutch device for readily securing it to or releasing it from the shaft 11, which consists of a ratchet-wheel 81, (see Figs. 23, 24, and 25,) rigidly secured to the shaft 11. On the side of the wheel 41 is loosely pivoted a ratchet-pawl 82, having a V-shaped groove 83 across the end thereof, the lower side of which groove, or that side which engages with the ratchet-wheel 81, is longer than the upper side. 84 represents a spring which keeps the pawl either in or out of engagement with the ratchet-wheel.

From the above construction it will be seen that when the pawl is in the position shown in Fig. 24 it is kept in engagement with the ratchet-wheel 81 by the spring 84, so that the sprocket-wheel is compelled to turn with the shaft 11, and when it is desired to throw it out of engagement, so said shaft will turn without moving the wheel 41, all that is required is to move the pawl into the position shown in Fig. 25, and the same spring holds it out of engagement, so that said shaft turns freely without moving the sprocket-wheel.

The sprocket-wheels 41 and 80 are connected by a sprocket-chain 85.

Below the shaker-bars 76 is pivoted by a pin 76ª, extending up from the lower part of the bar 75, (see Fig. 6,) a transverse bar 76ᵉ, to which is secured a series of shaker-bars 76ᶠ. These bars 76ᶠ, being attached to the transverse bars 76ᵉ, are capable of being turned to the right or left, substantially as shown in Fig. 5 by the dotted lines, when the bar 76ᵉ is turned on its pivotal center-pin 76ª. (Shown in Fig. 6.) These bars 76ᶠ are placed much closer together than the upper bars 76, so that while the dirt or other matter may be shaken through them the potatoes will be retained until they pass off over the end of the screen.

To each end of the shaker-bar 76ᵉ is rigidly secured a bar 86, (see Figs. 1, 2, 3, and 6,) both of which extend rearward and toward each other, (see Fig. 2,) and between them at their two ends is pivoted the lower end of a short connecting-rod 87. (See Figs. 1 and 3.) The upper end of the connecting-rod 87 is forked and pivoted to an adjusting-lever 88, having a series of perforations 88ª. (Shown in Figs. 1 and 3.) This adjusting-lever 88 is pivoted by a substantially upright pin 89 (see Fig. 3) to an arch-shaped bar 90, having its lower ends rigidly secured to the shaker-frame bar 75. Firmly secured to the arch-shaped bar 90 is a curved rack-bar 91. It is located directly over the pivoted lever 88. Near the handle 88ᶜ of the lever 88 is a pivoted handle portion 88ᶠ. Pivoted to the portion 88ᶠ is a connecting-rod 88ᵍ, having at its opposite end a spring-bolt 88ʰ, made in the usual way, so as to adapt it to engage with either of the notches 93 in the curved rack-bar 91.

From the above description it will be seen that the lower shaking-screen is capable of being adjusted to one side or the other and instantly secured by the spring-bolt when so adjusted. The object of this construction is to provide the means for depositing the potatoes at either side of the machine, as required.

At each side of the machine, rigidly secured to the side supporting frame-pieces, is located a curved rack-bar 94. (See Figs. 1 and 2.) Mounted loosely so as to turn on the pin 89 at the top of the arched bar 90 are two grooved pulleys 94ª and 94ᶜ. A handle portion 95 is pivoted to the lever 88, (see Figs. 1 and 3,) having pivoted at its lower end two connecting-rods 96 and 97, (see Figs. 1, 2, and 3,) both connecting-rods 96 and 97 being shown in Fig. 2. The opposite ends of the connecting-rods 96 and 97 are connected to chains, one of which, 96ª, passes around the grooved roller 94ª, and from thence down over the arched bar 90 and connects with a spring-bolt 98 for engaging with the curved rack-bar 94. The connecting-rod 97 connects with a chain 96ⁱ, which extends over and down the opposite side of the arched bar 90 and connects with a similar spring-bolt for engaging with the curved rack-bar on the opposite side of the machine. The object of this construction is to provide a suitable means for adjusting the inclination of the rear shaker on its pivotal center, the shaft 78, and securing it when so adjusted.

It will now be seen that when the machine is advancing the sprocket-chain 85 will operate the sprocket-wheel 80 and its crank-shaft 78, and thereby impart a rapid shaking movement to the screen at the rear end of the machine.

We claim as our invention—

1. In a potato-digger, the combination with the elevator-supporting frame, of an endless sprocket-chain mounted on sprocket-gearing on each side of the elevator-frame, a series of transverse bars provided with teeth pivotally mounted in said chains so that the teeth will hang downward when at the lower side of the chain and free to act by gravity, a longer tooth extending from each transverse bar forward far enough to permit its point to rest on the bar in front of it, and thereby keep all the teeth in said bars in a substantially horizontal position when at the upper side of the endless chains and thereby bring the openings through the elevator-screen closer together at the top than at the bottom, and means for operating the elevator, substantially as described.

2. In a potato-digger, the combination with the elevator-supporting frame, of an endless sprocket-chain mounted on sprocket-gearing on each side of the elevator-frame, a series of transverse bars provided with teeth, pivotally mounted in said chains, a longer tooth extending from each transverse bar far enough to rest its point on the bar in front of it, a short agitating-tooth inclining downward from each transverse bar, and a series of rollers over which the agitating-teeth are drawn while the machine is in operation, for giving the required shaking movements to the elevator, substantially as described.

3. In a potato-digger, the combination with the elevator-supporting frame, of an endless sprocket-chain mounted on sprocket-gearing on each side of the elevator-frame, a series of transverse bars provided with teeth pivotally mounted in said chains, a longer tooth extending from each transverse bar far enough to rest its point on the bar in front of it, and an agitating device whereby the required shaking movements are imparted to the elevator while the machine is in operation, as set forth.

4. In a potato-digger, the combination with the elevator and its inclining teeth of a supporting-bar, a crank-shaft mounted upon the axle, a crank rigidly secured at one end to the said shaft and pivotally connected at the other to the supporting-bar, a series of rollers and their supporting-bearings mounted at suitable intervals along the top of the said supporting-bar, and an operating-arm connected to the lower end of said supporting-bar, whereby the said supporting-bar and its series of rollers may be adjusted up or down and thus give a greater or less shaking movement to the elevator, substantially as set forth.

5. In a potato-digger, the combination of the supporting side frame-pieces of the machine with two side shields, each shield having two side arms pivoted at their upper ends thereto, and having their lower ends pivoted to the supporting side frame-pieces of the machine so that the two side arms supporting each shield will be substantially parallel with each other and inclined forward the weight of the shields keeping them in their forward position, and stops for limiting their forward movement, whereby a stone or other obstruction coming in front of either or both of the shields will move them backward and upward so that the obstruction can pass under the shield or up over the elevator substantially as described.

6. In a potato-digger, the combination with the elevator, its short downward and forward inclining teeth 26, of a supporting-bar 28, having its rear portion pivoted to a crank mounted loosely on the axle and carrying a series of rollers over which the depending elevator-teeth pass, a short crank-arm to which the front end of the bar, 28, is pivoted, and mechanism substantially as above described connected with said short crank-arm for raising or lowering the rollers and thereby adjusting the shaking movements of the elevator.

7. In a potato-digger, the combination with a draft-pole connected by an eyepiece with the draft-frame of the machine, of a frame having two vertical wheel-carrying bars mounted in vertical bearings therein, one at each side of the machine and each carrying a front wheel, a crank-arm secured to the top of each wheel-carrying bar having their opposite ends connected by a transverse connecting-bar, an angular operating-arm pivoted by a pin 55, to the draft-pole and extending horizontally under the transverse connecting-bar to which it is connected by a pivotal pin and then upward, terminating in a handle, and means substantially as above described for locking said handle-bar to any point to which it may be adjusted and thereby setting the wheels to any angle desired for the purposes described.

WILLIAM REUTHER.
JOHN REUTHER.

Witnesses:
JAMES SANGSTER,
L. M. SPONG.